United States Patent Office 3,475,808
Patented Nov. 4, 1969

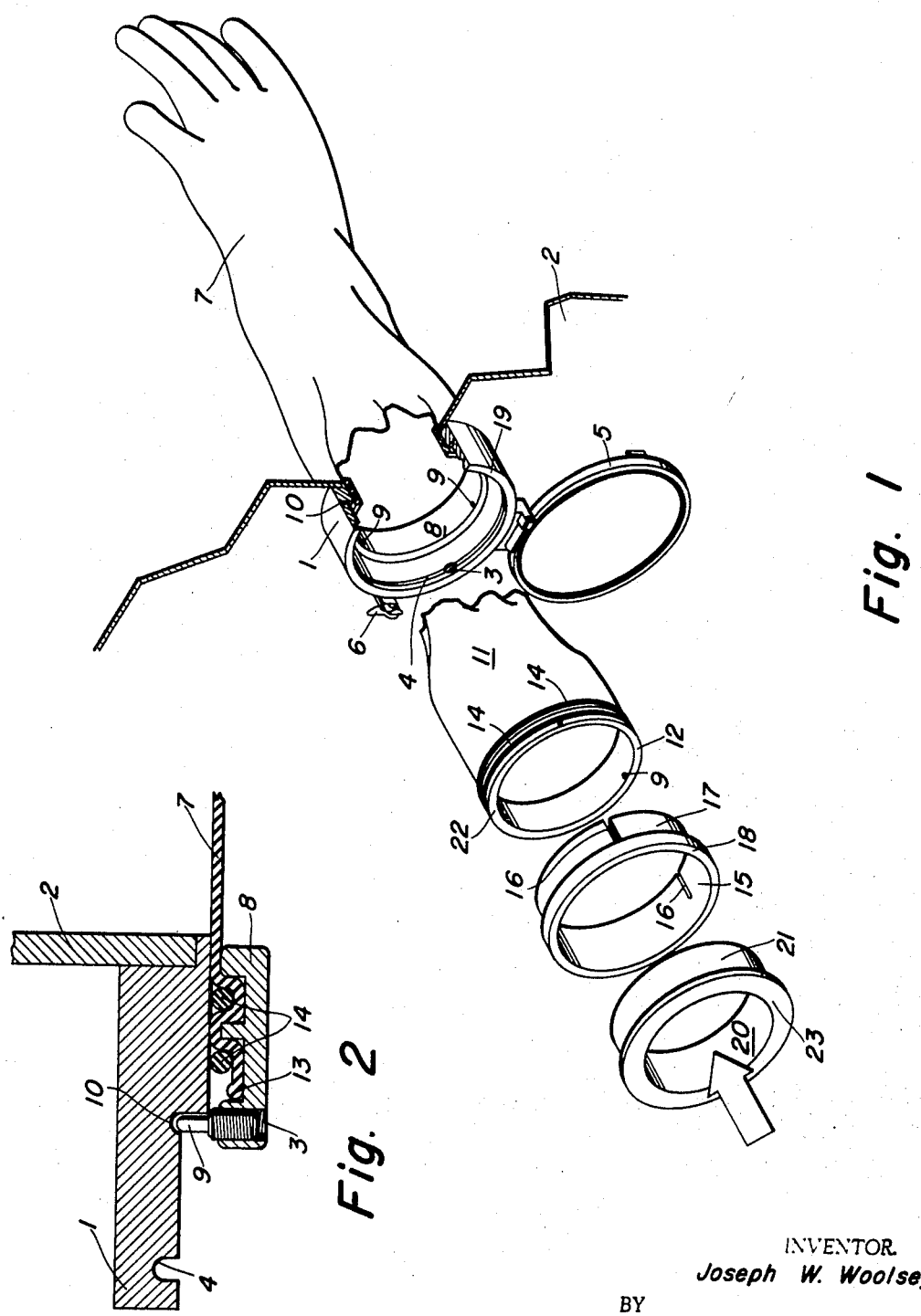

3,475,808
METHOD OF CHANGING GLOVES IN A CONTROLLED ENVIRONMENT BOX
Joseph W. Woolsey, Los Alamos, N. Mex., assignor to the United States of America as represented by the United States Atomic Energy Commission
Filed Mar. 9, 1967, Ser. No. 623,181
Int. Cl. B23p 7/00, 19/02
U.S. Cl. 29—401                    1 Claim

ABSTRACT OF THE DISCLOSURE

A method of changing gloves in a box which comprises mounting a new glove on a new mounting ring, loosening the set screws on the old mounting ring, inserting the new glove inside the old glove, inserting a guide ring aligned so that the set screws of the new mounting ring are positioned in grooves of the guide ring, exerting force on a push ring placed inside the guide ring and against the old glove ring so that the old glove and mounting ring fall into the box, removing the guide ring and push ring, and tightening the set screw in the new mounting ring.

---

The invention described herein was made in the course of, or under, a contract with U.S. Atomic Energy Commission.

In many situations a person performing manual operations must be separated from the material with which he is working, either by reason of the environment around the material or radiation reasons. In such a situation, ports are normally provided in a box and gloves mounted on the said port and extending into the box. The worker then stands outside the box with his hands inside the gloves and performs the necessary manual operations. When these gloves must be changed it is normally important to prevent contaminants either entering or leaving the contained environment. The present invention enables the rapid changing of gloves with an absolute minimum of transmitted contamination.

In the invention, the box is pressurized to ambient temperature and the port door opened. A new glove is mounted on a new mounting ring and the new glove is then placed inside the old glove so that the new mounting ring is flush with the old mounting ring. A guide ring is then inserted so that the set screws of the new mounting ring are positioned in grooves or slots of the guide ring, a push ring then being inserted inside the guide ring and force being exerted against the push ring so that the old glove and mounting ring fall into the chamber and the new mounting ring and glove are positioned in place of the old glove and mounting ring.

FIGURE 1 is an exploded view partially cut away to show the various components utilized in the glove chamber.

FIGURE 2 is a partial cross section of the mounting ring and glove correctly positioned in the glove port.

For the present invention port 1 (in true round) having two circumferential grooves 4 and 10 is provided on chamber 2. The specific embodiment makes reference to welding chambers but it will be understood that the glove changing described herein may be performed on any suitably modified dry box or other controlled environment chamber known to the prior art. Glove port 1 has a radial tapped hole 3 through it, communicating to groove 4. A vacuum line is connected to this hole 3 so that when door 5 is closed by clamps 6, the environment inside the glove can be evacuated just as is the welding chamber. Door 5 is, of course, capable of forming a seal with port 1 by the use of O-rings or other known means. In the diagram the old glove 7 is shown mounted on the old mounting ring 8. This mounting ring 8 and glove 7 are anchored by set screws 9 which extend into the other groove 10 of port 1. The set screws prevent the mounting ring and glove from being pushed into or out of the chamber thereby transmitting contamination.

In preparing to change gloves a new glove 11 is mounted on a new mounting ring 12. Mounting ring 12 (identical to 8) has two outside circumferential grooves. After the cuff of glove 11 is placed over the mounting ring (the welt 13, or end, of the glove is placed in the larger of these two grooves), an O-ring 14 is placed in the other groove and another O-ring may, if desired, be placed on the box side of the welt in the larger groove (see FIGURE 2). The size of the O-ring is determined by the amount of compression desired and the depth of the grooves.

In changing the gloves the interior of chamber 2 is pressurized to atmospheric pressure. After door 5 is opened set screws 9 are loosened or removed. New glove 11 is then placed inside old glove 7. The new glove mounting ring 12 will consequently be flush against old mounting ring 8. Set screws 9 are loosely positioned in new mounting ring 12 either before or after placing the new glove inside the old. The guide ring 15 is then positioned so that the three set screws 9 are lined with the three slots 16 of guide ring 15. The narrow portion 17 of ring 15 fits over the new glove mounting ring 12, new glove 11 and new O-ring 14, and fits inside of glove port 1 between groove 10 and the outside edge of said glove port 1. This guide ring is necessary for the practice of the invention in that it prevents unequal forces being exerted against the glove with a resulting cocking of the mounting ring so that an effective seal is not possible. The larger portion 18 of guide ring 15 fits flush against the outer edge 19 of glove port 1.

As a final step, push ring 20 is placed inside guide ring 15 and force exerted. Narrow portion 21 of push ring 20 will abut face 22 of the new mounting ring 12. Force on this face, of course, pushes the equivalent face of old mounting ring 8 until the new mounting ring is in the place of the old. The necessary distance of travel is equivalent to the axial length of said narrow portion 21 of push ring 20. Wider portion 23 of course abuts wider portion 18 of guide ring 15. To complete the changing, the guide ring and the push ring are removed. Set screws 9 are then tightened into groove 10. The old glove and mounting ring assembly may then, if desired, be disassembled and removed. When working with contaminants such as radioactive elements an advantage of the present invention is that the mounting ring should not become contaminated while in use since it is sealed from the radioactive environment by at least one O-ring 14.

What is claimed is:

1. A method of changing gloves in a controlled environment box, said box having a port, an old glove on an old mounting ring, the old glove and old mounting ring being positioned in and secured to the port by set screws which comprises loosening the set screws on the old mounting ring, inserting a new glove inside the old glove, said new glove being mounted on a new mounting ring, inserting a guide ring over said new mounting ring and so aligned that set screws placed in the new mounting ring are positioned in grooves of the guide ring, placing a push ring against the said guide ring, exerting force on the said push ring so that the old glove and old mounting ring are forced out of said port and fall into the box and the new glove and new mounting ring are positioned in said port, removing the guide ring and push ring, and tightening the set screws in the new mounting ring to secure the new mounting ring to said port.

References Cited

UNITED STATES PATENTS

| | | |
|---|---|---|
| 2,985,129 | 5/1961 | Kirkpatrick. |
| 3,025,403 | 3/1962 | Belknap et al. |
| 3,148,690 | 9/1964 | Petersen. |
| 3,267,830 | 8/1966 | Gaasbeek. |
| 3,290,502 | 12/1966 | Skinner et al. _____ 250—108 |
| 3,341,930 | 9/1967 | Belanger _____ 29—401 |
| 3,323,846 | 6/1967 | Boddy _____ 312—1 |
| 2,862,307 | 12/1958 | Bloomer et al. _____ 312—1 |

CHARLIE T. MOON, Primary Examiner

U.S. Cl. X.R.

29—427, 451; 214—1; 250—108